United States Patent [19]
Zinger

[11] Patent Number: 5,343,418
[45] Date of Patent: Aug. 30, 1994

[54] THREE-TO-TWO CARRY SAVE ADDER CELL

[75] Inventor: Ron Zinger, Sunnyvale, Calif.

[73] Assignee: Intel Corporation, Santa Clara, Calif.

[21] Appl. No.: 934,943

[22] Filed: Aug. 25, 1992

[51] Int. Cl.$^5$ ............................................. G06F 7/50
[52] U.S. Cl. ................................................. 364/784
[58] Field of Search ..................................... 364/784

[56] References Cited

U.S. PATENT DOCUMENTS

| | | | |
|---|---|---|---|
| 4,621,338 | 11/1986 | Uhlenhoff | 364/784 |
| 4,897,808 | 1/1990 | Nakagawa et al. | 364/784 |
| 5,151,875 | 9/1992 | Sato | 364/784 |

*Primary Examiner*—David H. Malzahn
*Attorney, Agent, or Firm*—Blakely, Sokoloff, Taylor & Zafman

[57] ABSTRACT

A three-to-two adder which takes advantage of the fact that one of the inputs lags behind the other two inputs. A gate delay is eliminated in the currently preferred embodiment, an output is provided within two gate delays from the time that the last to arrive signal is valid. The adder is implemented using fewer gates than prior art adders.

4 Claims, 2 Drawing Sheets

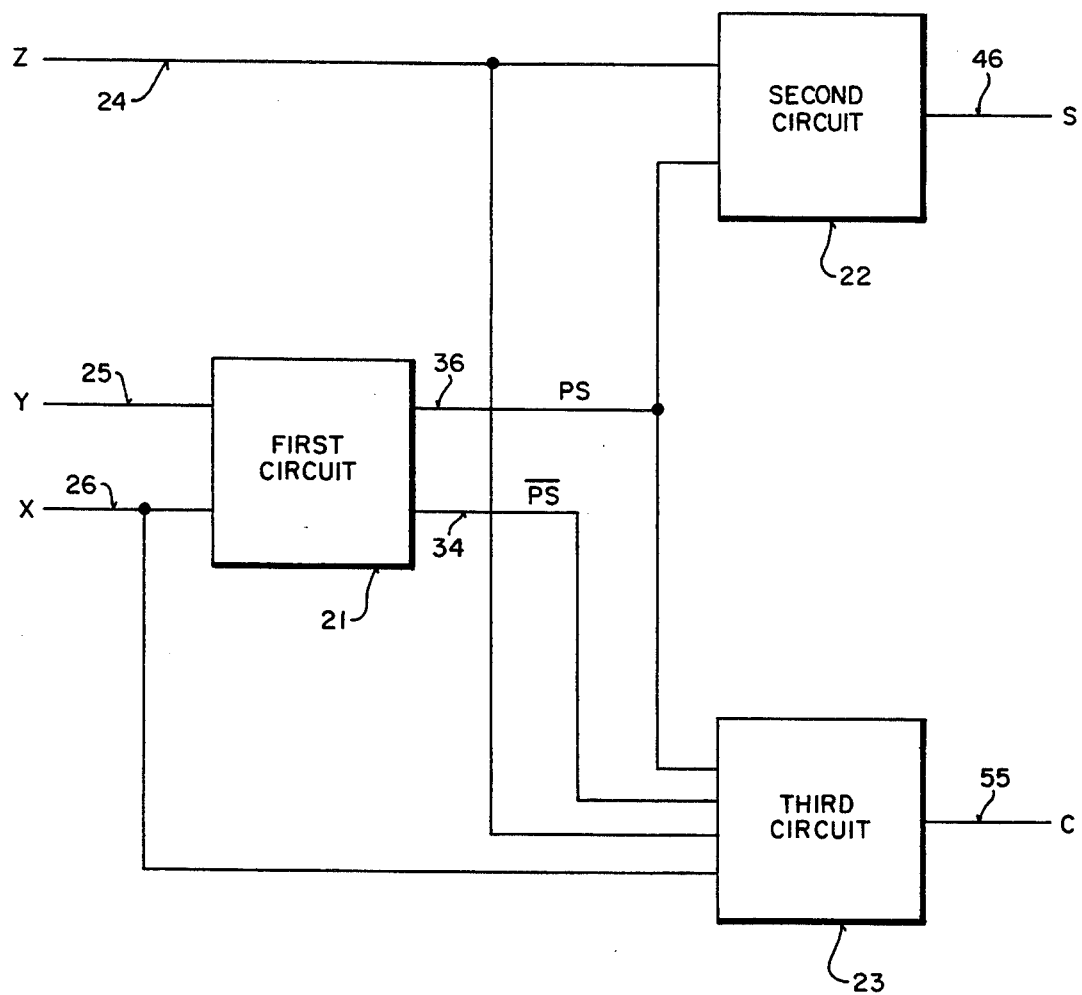
FIG _1

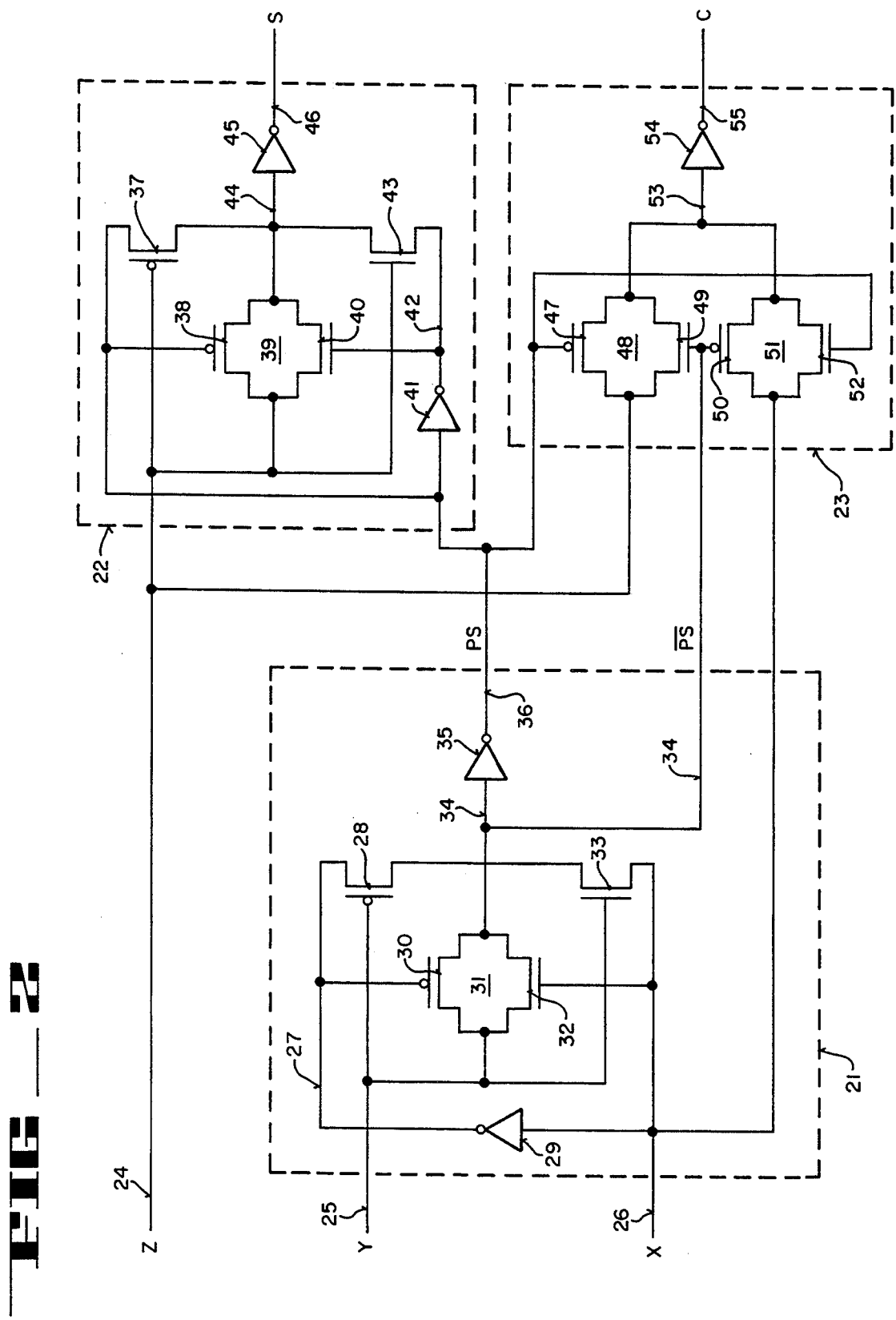
FIG_2

THREE-TO-TWO CARRY SAVE ADDER CELL

BACKGROUND OF THE PRESENT INVENTION

1. Field of the Invention

The present invention relates to the field of digital adders and more specifically to a three-to-two full adder cell.

2. Prior Art

Fundamental to the operation of virtually all digital microprocessors is the function of digital (i.e., binary) addition. Addition is used not only to provide numerical sums that the user is conscious of, but also in the implementation of numerous logic functions. In a typical microprocessor, many adders are used for these functions. When two digital words are added, it is common for one word to lag behind the other. A problem with this, particularly for circuits repeating the addition process several times is that substantial time is required to wait for the lagging input before the addition is performed. Since adders are often performing logic functions in critical paths, this waiting can slow up the microprocessor.

The present invention is an improved three-to-two adder in that fewer delays are encountered along critical paths in the adder. The adder therefore provides substantial improvement in terms of operation when compared to prior art adders. The present invention also reduces the number of transistors needed to implement the adder cell. This becomes significant when many of the adder cells are implemented together.

Prior art adders are shown in U.S. Pat. Nos. 4,783,757; 4,737,926; 4,905,180; and 4,901,270.

SUMMARY OF THE INVENTION

A three-to-two adder cell is described which includes three circuits. The adder accepts three inputs and generates two outputs representing the complemented sum of the three inputs. The three inputs comprise one signal representing a carry-in bit and two signals representing two input bits to be added. The first circuit receives two input signals which lead in time compared to the other input signal, and produces a partial sum. The second circuit, coupled to receive the partial sum from the first circuit and the lagging third input signal, produces a sum output signal of the adder cell. The third circuit, coupled to receive the partial sum, one of the leading input signals and the lagging input signal, produces a carry-out signal of the adder cell. In the currently preferred embodiment, once the lagging input is present, the delay in the add operation is equal to the propagation time of two gates.

As will be seen, this arrangement decreases the number of gates in the critical path of the adder and hence reduces delays found with other adders.

Other aspects of the invention will become apparent from the following detailed description.

BRIEF DESCRIPTION OF THE DRAWINGS

FIG. 1 is a general block diagram providing an overview of the present invention.

FIG. 2 is an electrical schematic of the currently preferred embodiment of the present invention.

DETAILED DESCRIPTION OF THE INVENTION

A three-to-two adder cell for improving the speed of adding numbers is described. In the following description numerous specific details are set forth such as specific circuits (e.g., specific gates) in order to provide a thorough understanding of the present invention. It will be obvious, however, to one skilled in the art that the present invention may be practiced without these specific details. In other instances, well-known circuits have been shown in block diagram form in order not to obscure the present invention in unnecessary detail.

The adder cell of the present invention is preferably fabricated employing CMOS technology. The specific technology employed in fabricating the adder is not critical to the present invention and any one of a plurality of well-known processes may be used to realize the present invention.

Referring to FIG. 1, the adder cell of the present invention accepts three input signals X, Y and Z (lines 26, 25 and 24, respectively) and generates two output signals S and C (lines 46 and 55, respectively). These output signals represent a complemented sum of the three input signals and are generated according to the following equations:

$$S = \overline{X \oplus Y \oplus Z} \quad (1)$$

$$C = \overline{X \cdot Y + X \cdot Y \cdot Z + X \cdot Y \cdot Z} \quad (2)$$

In the presently preferred embodiment, three circuits implement this adder. These circuits, shown in detail in FIG. 2 are circuits 21, 22, and 23. The circuits 22 and 23 operate in parallel.

The first circuit 21 is coupled to receive input signals X on line 26 and Y on line 25; this circuit then produces a partial sum output (PS) on line 36 and its complement $\overline{PS}$. The second circuit is coupled to receive PS and input signal Z on line 24; this circuit then produces S on line 46. The third circuit is coupled to receive PS, a complement of this partial sum ($\overline{PS}$), X, and Z; this circuit then produces C on line 55.

Often one of the input signals will lag in time behind another input signal. The present invention takes advantage of this lag by performing several steps without the need for this input and thus these steps can occur before the lagging input arrives. Input signal Z, representing the lagging input, is applied to the second and third circuits of the adder. Input signal Y which leads Z is applied to the first circuit, and input signal X which also leads Z is applied to both the first and third circuits. With this arrangement, the first circuit is able to complete its processing before the lagging input arrives. The second circuit then receives input signal Z and the output signals from the first circuit; when the lagging input arrives, the first circuit will have produced PS and $\overline{PS}$ for the second and third circuits. By designing the adder to perform non-Z related processing before Z arrives, the through time of the adder will equal the propagation of Z through the second circuit following the presence of Z. The present invention reduces the propagation of Z as compared to prior art adders.

FIG. 2 shows a detailed electrical schematic diagram of the adder of the currently preferred embodiment. The first circuit 21 is coupled to receive input signals X and Y on lines 26 and 25, respectively. Line 36 couples the first circuit to the second circuit 22. The second circuit is coupled to receive input signal Z from line 24. Lines 34 and 36 couple the first circuit to the third circuit 23. The third circuit is coupled to receive input signals X from line 26 and Z from line 24.

This first circuit comprises inverters 29 and 35, a transfer device 31, a p-channel transistor 28, and a n-channel transistor 33. The transfer device 31 comprises a p-channel transistor 30 and an n-channel transistor 32 coupled in parallel. Input X (line 26) is coupled to the input of inverter 29, to a gate of the n-channel transistor 32, and to a terminal of transistor 33. Line 27 couples the output of inverter 29 to a terminal of transistor 28 and to a gate of the p-channel transistor 30. Input Y (line 25) is coupled to a gate of the p-channel transistor 28, to a gate of the n-channel transistor 33, and to the input terminal of transfer device 31. Line 34 couples the other terminals of transistors 28 and 33, and the output of transfer device 31 to the input of inverter 35. Line 34 provides $\overline{PS}$. The inverter produces an output on line 36 which is the partial sum (PS) of the adder which is equal to logical $X \oplus Y$.

This second circuit comprises inverters 41 and 45, a transfer device 39, a p-channel transistor 37, and an n-channel transistor 43. The transfer device 39 comprises a p-channel transistor 38 and an n-channel transistor 40. Input PS (line 36) is coupled to the input of inverter 41, to a gate of the p-channel transistor 38, and to one terminal of transistor 37. Line 42 couples the output of inverter 41 to one terminal of transistor 43 and to the gate of the n-channel transistor 40. Input Z (line 24) is coupled to the gate of p-channel transistor 37, to a gate of the n-channel transistor 43, and to the input of transfer device 39. Line 44 couples the other terminals of transistors 37 and 43, and the output of transfer device 39 to the input of inverter 45. The inverter produces a first adder output S on line 46 which is equal to logical $X \oplus Y \oplus Z$.

This third circuit comprises two transfer devices 48 and 51. Transfer device 48 comprises a p-channel transistor 47 and an n-channel transistor 49 coupled in parallel. Transfer device 51 comprises a p-channel transistor 50 and an n-channel transistor 52 coupled in parallel. Input signal X (line 26) is coupled to the input of transfer device 51. Input signal Z (line 24) is coupled to the input of transfer device 48. PS (line 36) is coupled to the gate of the p-channel transistor 47 and to the gate of the n-channel transistor 52. $\overline{PS}$ arrives on line 34 which is coupled to a gate of the n-channel transistor 49 and to a gate of the p-channel transistor 50. Line 53 couples the output of transfer device 48 and an output of transfer device 51 to the input of inverter 54. The inverter produces a second adder output C on line 55 which is equal to logical $X \cdot Y + X \cdot \overline{Y} \cdot Z + X \cdot \overline{Y} \cdot Z$.

The propagation paths of Z are the time critical paths of the adder. In the second circuit theta are three possible propagation paths, at most two paths will be connected at one time and these two paths are in parallel. In the first path, Z controls transistor 37; this leads to inverter 45 which produces output S on line 46. In the second path, Z passes through transfer device 39 to inverter 45 which produces output S on line 46. In the third path, Z controls transistor 43. The output of this transistor passes through inverter 45 to produce output S on line 46. In the third circuit, Z passes through transfer device 48 to inverter 54 which produces output C on line 55. Therefore, the propagation delay through the second and third circuit is one gate time and the delay of an inverter (another gate time). The second and third circuits operate in parallel.

The typical prior art adder included one additional inverter in the time critical Z path. By using one fewer inverter, an improvement in speed of 40%–50% is achieved over the prior art. The present invention only requires 22 gate to implement. (This includes two gates per inverter.) This is a savings of two gates over prior art adders.

Thus, a three-to-two adder has been described which provides an minimum number of gate delays. The adder operates between 40%–50% faster than prior art adders while requiring fewer gates. The adder provides a particular advantage when used in a carry save adder implementation.

We claim:

1. An adder comprising:
   a first circuit coupled to a first input and a second input for providing a first intermediate output representing a sum of said first and second inputs;
   a first inverter coupled to receive said first intermediate output for providing a second intermediate output representing a sum of said first and second inputs;
   a second circuit for providing a first adder output representing a sum of a third input and said second intermediate output, said second circuit including an input inverter, an output inverter, and a plurality of transistors each coupled directly to receive said third input, each of said plurality of transistors being coupled directly to said input inverter and said output inverter, said output inverter providing the first adder output, said second circuit being coupled to said first circuit; and
   a third circuit coupled directly to said first input, said third input, and said first intermediate output for providing a second adder output by selecting between said first and said third input as a function of said first intermediate output.

2. The adder of claim 1, wherein said second intermediate output comprises the exclusive OR'ing function of said first and second input and said first adder output comprises the exclusive NOR'ing function of said second intermediate output and said third input.

3. The adder of claim 1, wherein said plurality of transistors includes a first transistor, a second transistor, a third transistor, and a fourth transistor;
   said second intermediate output being coupled directly to one terminal of said first transistor, the gate of said second transistor, and the input of said input inverter;
   the output of said input inverter being coupled directly to the gate of said third transistor and one terminal of said fourth transistor;
   said third input being directly coupled to the gates of said first and fourth transistors and to one terminal of said second and third transistors;
   the input of said output inverter being directly coupled to the other terminal of said first, second, third and fourth transistors; and
   wherein said first and second transistors are p-type and said third and fourth transistors are n-type.

4. The adder of claim 1, wherein said third circuit comprises a first transfer device and a second transfer device, said first intermediate output being directly coupled to enable said first and second transfer devices, said first input being directly coupled to said first transfer device, said first input being directly transferred by said first transfer device, said third input being directly transferred by said second transfer device, said first and second transfer devices for providing said second adder output.

* * * * *

UNITED STATES PATENT AND TRADEMARK OFFICE
CERTIFICATE OF CORRECTION

PATENT NO. : 5,343,418
DATED : August 30, 1994
INVENTOR(S) : Ron Zinger

It is certified that error appears in the above-indentified patent and that said Letters Patent is hereby corrected as shown below:

Column 3; Line 51; Delete "theta"; Insert in place thereof --there--

Signed and Sealed this

Nineteenth Day of September, 1995

Attest:

BRUCE LEHMAN

*Attesting Officer*    Commissioner of Patents and Trademarks